United States Patent [19]
Furuki et al.

[11] Patent Number: 5,233,434
[45] Date of Patent: Aug. 3, 1993

[54] METHOD AND SYSTEM FOR ENCODING AND DECODING VIDEO DATA

[75] Inventors: Tsuneo Furuki, Yamato; Yasuo Ito; Kazuo Hikawa, both of Yokohama, all of Japan

[73] Assignee: Victor Company of Japan, Ltd., Yokohama, Japan

[21] Appl. No.: 485,547

[22] Filed: Feb. 27, 1990

[30] Foreign Application Priority Data

Feb. 28, 1989 [JP] Japan .................................. 1-47881

[51] Int. Cl.⁵ ............................................ H04N 5/781
[52] U.S. Cl. ................................. 358/310; 358/342
[58] Field of Search ............... 358/37, 160, 166, 21 R, 358/39, 40, 310, 342, 335, 327

[56] References Cited

U.S. PATENT DOCUMENTS 4,652,905 3/1987 Lippel .
5,032,901 7/1991 Vlahos .................................. 358/22

FOREIGN PATENT DOCUMENTS 0176093 4/1986 European Pat. Off. .
0284266 9/1988 European Pat. Off. .
0332777 9/1989 European Pat. Off. .

OTHER PUBLICATIONS

"Compact Disc Digital Audio System" 908 IEC 1987.

*Primary Examiner*—Robert L. Richardson
*Attorney, Agent, or Firm*—Pollock, VandeSande & Priddy

[57] ABSTRACT

An original image signal is encoded into an image code signal of a predetermined format through an approximation process on colors. A first luminance component is derived from the image code signal. A second luminance component is derived from the original image signal. A difference between the first luminance component and the second luminance component is derived. The difference is converted into a luminance corrective signal. The image code signal and the luminance corrective signal are transmitted via a common transmission line. In a decoder, the luminance corrective signal is decoded to a luminance difference signal, which is added to an image signal decoded from the image code signal.

2 Claims, 6 Drawing Sheets

METHOD AND SYSTEM FOR ENCODING AND DECODING VIDEO DATA

BACKGROUND OF THE INVENTION

This invention relates to a method and a system for encoding video data, and also relates to a system for decoding video data.

A compact disk (CD) is an excellent medium for recording digitized audio data. It is known to record video data into a compact disk (CD) in addition to audio data. CD graphics is an application of a CD system to the visual art. As will be explained later, a prior art CD graphics system has a problem in the picture quality.

SUMMARY OF THE INVENTION

It is a first object of this invention to provide a system for encoding video data which enables a high picture quality.

It is a second object of this invention to provide a system for decoding video data which enables a high picture quality.

It is a third object of this invention to provide a system for encoding and decoding video data which enables a high picture quality.

It is a fourth object of this invention to provide a method of encoding video data which enables a high picture quality.

According to a first aspect of this invention, an encoding system for an image signal comprises an encoder encoding an original image signal into an image code signal of a predetermined format through a color approximation process; means for deriving a first luminance component from the image code signal; means for deriving a second luminance component from the original image signal; means for deriving a difference between the first luminance component and the second luminance component; means for converting the difference into a luminance corrective signal; and means for transmitting the image code signal and the luminance corrective signal via a common transmission line.

According to a second aspect of this invention, a decoding system for an image code signal and a luminance corrective signal transmitted via a common transmission line comprises means for discriminating the image code signal and the luminance corrective signal; and means for adding the discriminated image code signal and the discriminated luminance corrective signal to generate a luminance-corrected image signal.

According to a third aspect of this invention, an encoding and decoding system for an image signal comprises an encoder encoding an original image signal into an image code signal of a predetermined format through a color approximation process; means for deriving a first luminance component from the image code signal; means for deriving a second luminance component from the original image signal; means for deriving a difference between the first luminance component and the second luminance component; means for converting the difference into a luminance corrective signal; means for transmitting the image code signal and the luminance corrective signal via a common transmission line; means for discriminating the image code signal and the luminance corrective signal transmitted via the common transmission line; and means for adding the discriminated image code signal and the discriminated luminance corrective signal to generate a luminance-corrected image signal.

According to a fourth aspect of this invention, a method of encoding an image signal comprises the steps of encoding an original image signal into an image code signal of a predetermined format through a color approximation process; deriving a first luminance component from the image code signal; deriving a second luminance component from the original image signal; deriving a difference between the first luminance component and the second luminance component; converting the difference into a luminance corrective signal; and transmitting the image code signal and the luminance corrective signal via a common transmission line.

BRIEF DESCRIPTION OF THE DRAWINGS

Like and corresponding elements are denoted by the same reference characters throughout the drawings.

DESCRIPTION OF THE PREFERRED EMBODIMENTS

Before the detailed description of this invention, a prior art CD data format and a prior art CD graphics system will be explained for a better understanding of this invention.

Figure 1:
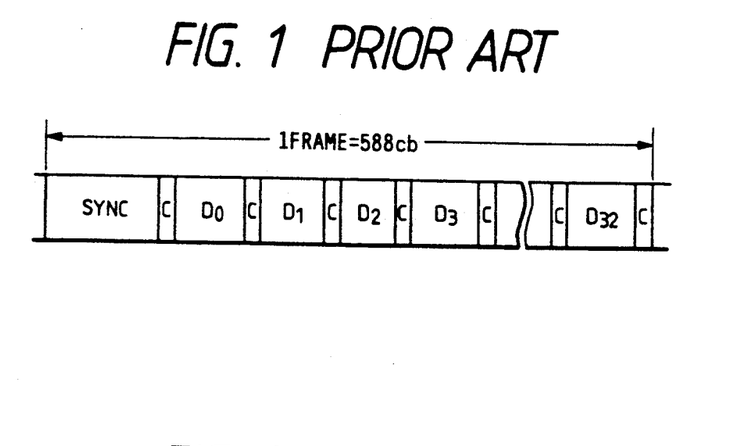
FIG. 1 is a diagram showing a conventional frame format used in the recording of a digital signal on a compact disk (CD).

FIG. 1 shows a conventional frame format used in the recording of a digital signal on a compact disk (CD). As shown in FIG. 1, one frame has 588 channel bits (cb). A head of each frame includes a frame sync signal SYNC occupying 24 channel bits. The frame sync signal SYNC is followed by data D0–D32 each having 14 channel bits. Connecting segments C each having 3 channel bits called merging bits are provided between the frame sync signal SYNC and the data D0–D32. The 14-cb data D0–D32 have been converted from respective 8-bit data through EFM (Eight-to-Fourteen Modulation). Each 8-bit data unit is called "a symbol". In each frame, the first data D0 are represented by one symbol of subcodes, and the second and later data D1–D32 are represented by 24 symbols of audio (music) data and 8 symbols of error correction data (parities). Successive bits of one symbol composing subcodes are denoted by the letters P, Q, R, S, T, U, V, and W respectively. The bits P and Q are used as a time code. The bits R-W can be used for CD graphics data.

Figure 2:
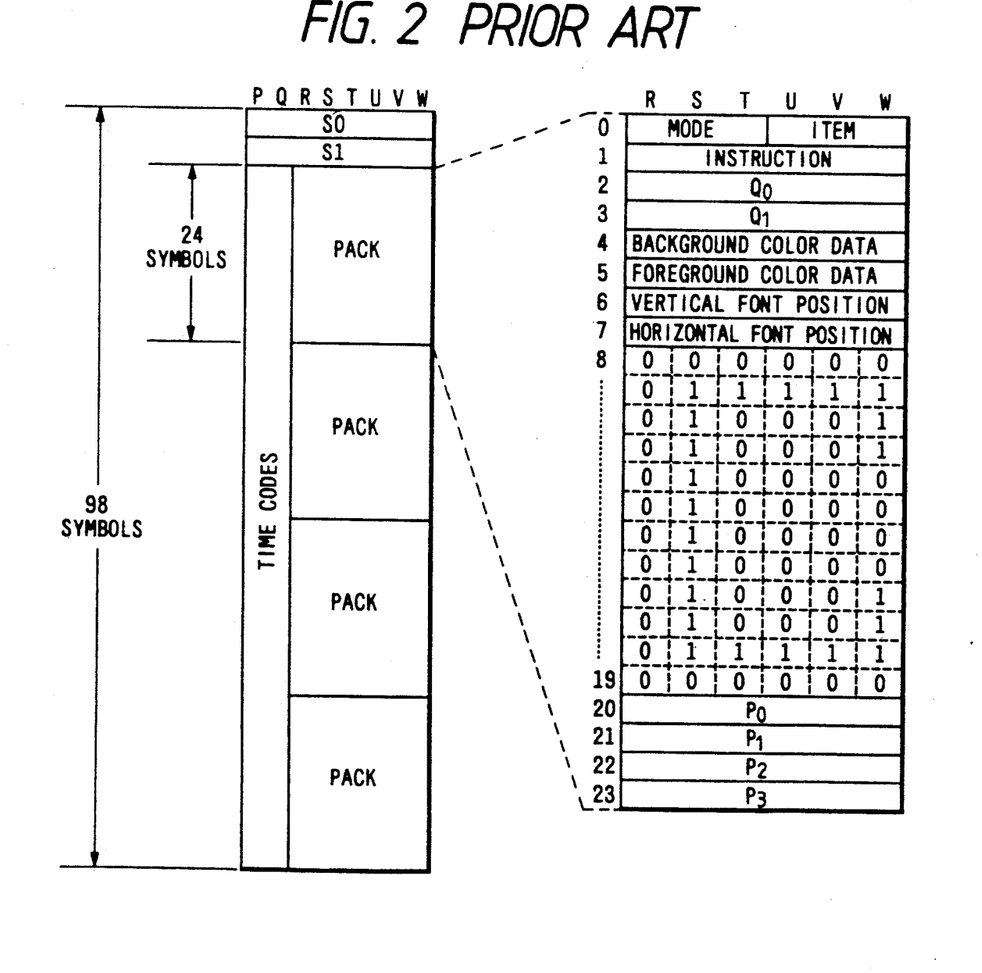
FIG. 2 is a diagram showing a conventional CD signal format.

In respect of subcodes, as shown in the left-hand part of FIG. 2. one data block is composed of symbols whose amount corresponds to 98 symbols. The first and second symbols are allotted to subcode sync signals S0 and S1. The bits P and Q of the later 96 symbols are used as time codes as described previously. The bits R-W of the 96 symbols which represent CD graphics data are separated into 4 packs each corresponding to 24 symbols.

As shown in the right-hand part of FIG. 2. each pack has 0-th to 23-rd symbols. The bits R-W of the 0-th symbol represent a mode and an item related to conditions of use of the pack. The mode and the item being "001" and "001" denote a television graphics mode (CD graphics mode). The standard of the CD digital audio system, including the subcode structure, is described in detail in IEC (International Electrotechnical Commission) Publication 908:1987.

Figure 3:
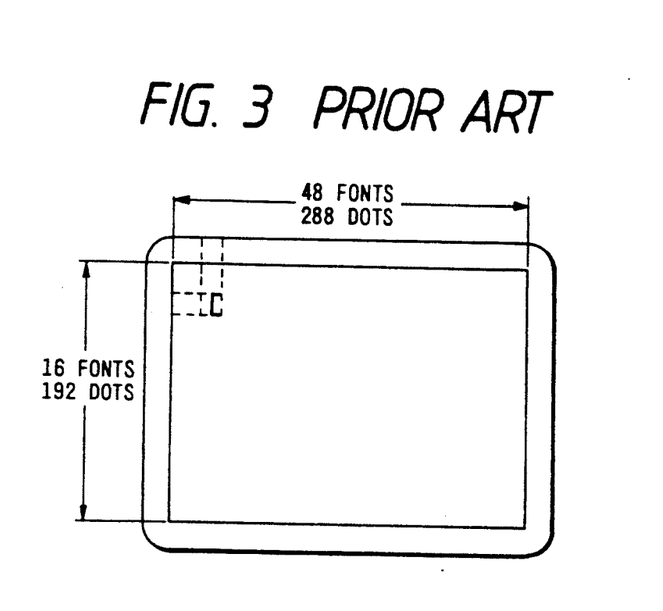
FIG. 3 is a diagram of a frame of conventional CD graphics.
Figure 4:
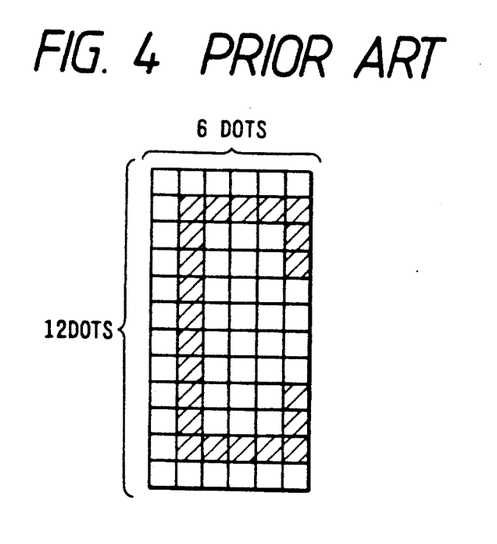
FIG. 4 is a diagram of a font of conventional CD graphics.

Prior art CD graphics will be explained hereinafter. As shown in FIG. 3, a frame of CD graphics has a horizontal size of 48 fonts and a vertical size of 16 fonts. The CD graphics frame is composed of 288 pixels by 192 pixels. The pixels are also referred to as dots. As shown in FIG. 4, each font is composed of 6 dots by 12 dots. The number of different colors used in a CD graphic frame is limited to only 16 since the bit rate of CD subcodes is small, equalling only about 3% of the bit rate of entire CD information. Graphics data are allotted to CD subcodes, and the bit rate of the graphics data is limited to about 21.6 kbit/sec.

In a prior art CD graphics apparatus, a transmission image is sampled into pixel data. The pixel data is represented by 16 different colors, and the pixel data is coded in unit of font. The resulting codes are transmitted. This transmission system is a CLUT transmission system (color look-up table pallet transmission system).

With reference to the right-hand part of FIG. 2, when the mode and the item denoted by the 0-th symbol represent CD graphics, six bits of the first symbol contain an instruction. There are various instructions such as "preset memory with mono color", "preset border color", "write font", "scroll", "load CLUT", and "EX-OR font". Six bits of the second symbol and six bits of the third symbol represent error correction parities Q0 and Q1 for the control data in the 0-th and the first symbols. Six bits of each of 4-th to 19-th symbols are used as a data field containing image data.

In the case where the instruction is a write font command, the 4-th symbol has background color data (a color number explained later) and the 5-th symbol has foreground color data (for example, a color number for a color of a letter). In addition, the 6-th symbol has data representing a vertical position of a transmission font relative to the screen, and the 7-th symbol has data representing a horizontal position of the transmission font relative to the screen. Six bits by twelve bits of the 8-th symbol to 19-th symbol represent image data of the transmission font which is composed of 6 dots by 12 dots. In the right-hand part of FIG. 2, the image data of the transmission font corresponds to the letter "C". In the image data of the transmission font, "0" corresponds to the background color and "1" denotes the foreground color. Six bits of each of the 20-th to 23-rd symbols represent error correction parities P0, P1, P2, or P3 for the data in the 0-th to 19-th symbols.

The background color and the foreground color are selected from predetermined 16 different colors which are identified by color numbers from "0" to "15" respectively. The color numbers are denoted by 4-bit data. The 16 colors are preselected from 4,096 available colors and are transmitted or recorded as a CLUT in advance. CLUT is a group of data (from the color number "1" to the color number "15") each of which has 12 bits representing the brightnesses or tones of red, green, and blue.

In the case where the instruction is a load CLUT command, the 4-th to 19-th symbols contain a group of CLUT data representing the color numbers "0" to "7" or the color numbers "8" to "15".

An EX-OR front command instructs to change color of a number of parts of a font by replacing a previously designated color number with an exclusive logical sum of the previously designated color number and a color number designated by the EX-OR front command itself. The code format of the conventional CD graphics is described in detail in JAS (Japan Audio Society) JOURNAL, September issue of 1984.

Figure 5:
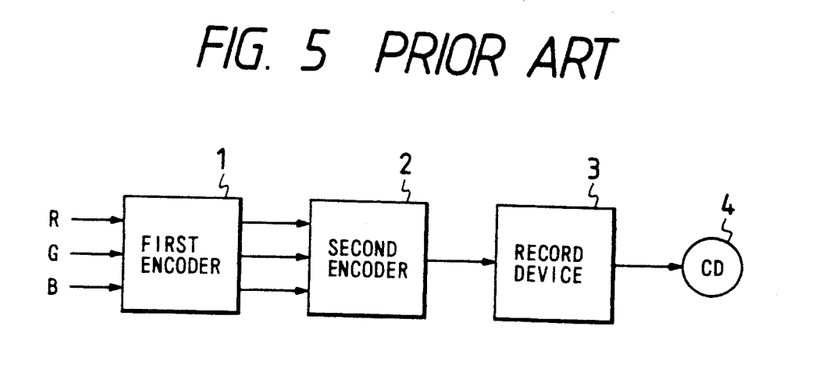
FIG. 5 is a block diagram of a recording section of a conventional CD graphics system.

A prior art CD recording and reproducing system capable of performing CD graphics will be explained hereinafter. As shown in FIG. 5, a recording section of the prior art CD system includes encoders 1 and 2. Input image data composed of R (red), G (green), and B (blue) color signals are converted by the first encoder 1 into image data represented by at most 16 color numbers through a sampling process and an approximation process. A frame of the output image data from the first encoder 1 has 288 pixels by 192 pixels. The output image data from the first encoder 1 are subjected to a font packing process by the second encoder 2, and are combined with error correction parity codes and are interleaved. Output image data from the second encoder 2 are optically recorded by a recording device 3 on a compact disk 4 as R-W subcodes.

Figure 6:
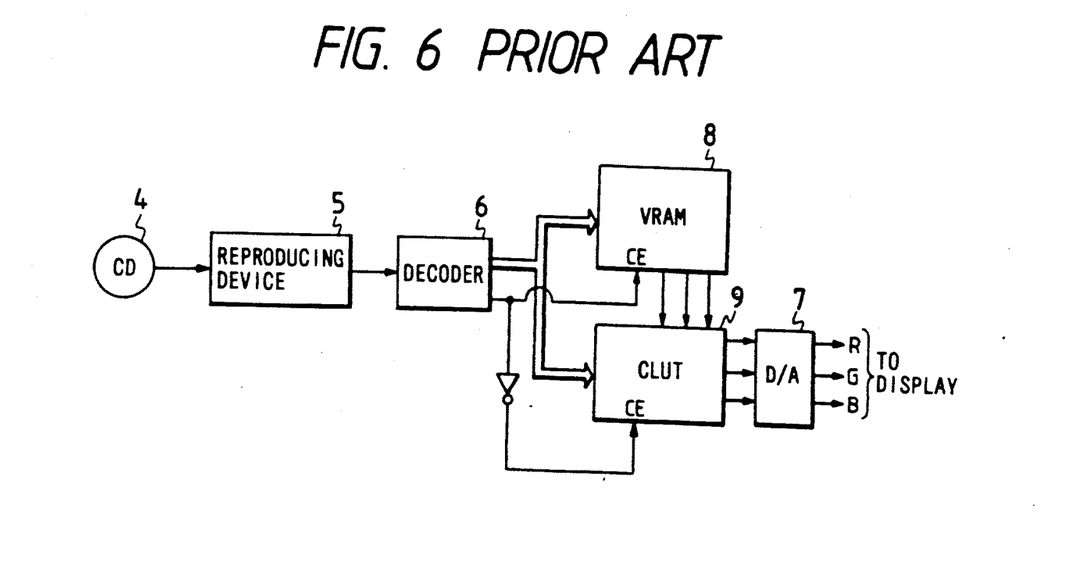
FIG. 6 is a block diagram of a reproducing section of the conventional CD graphics system.

As shown in FIG. 6, a reproducing section of the prior art CD system includes a reproducing device 5 which reproduces a signal from a compact disk 4 as a digital signal. The reproduced digital signal is de-interleaved by a decoder 6, and R-W subcodes are extracted from the reproduced digital signal. The R-W subcodes grouped in unit of pack undergo demodulation or an instruction decoding process, and image data are written into a RAM 8 for video while color data are written into a RAM of a CLUT section 9. The command for drawing in unit of font enables a frame of the image data to be written into the video RAM 8. For example, the image data represent the color numbers for the foreground color and the background color. In the case of a font having three or more colors, the colors in the font are changed by one, two or three EX-OR font commands. The image data read out from the video RAM 8 are converted by the CLUT section 9 into R, G, B color data in correspondence with the color numbers. The R, G, B color data are converted by a D/A converter 7 into corresponding analog R, G, and B color signals which are fed to a display (not shown) to be indicated as CD graphics.

As understood from the previous description, in the prior art CD system of FIGS. 5 and 6, a reproduced CD graphics image is rough because it is represented by only a small number of at most 16 different colors.

This invention resolves such a problem in the prior art CD system. Embodiments of this invention will be described in detail hereinafter.

Figure 7:
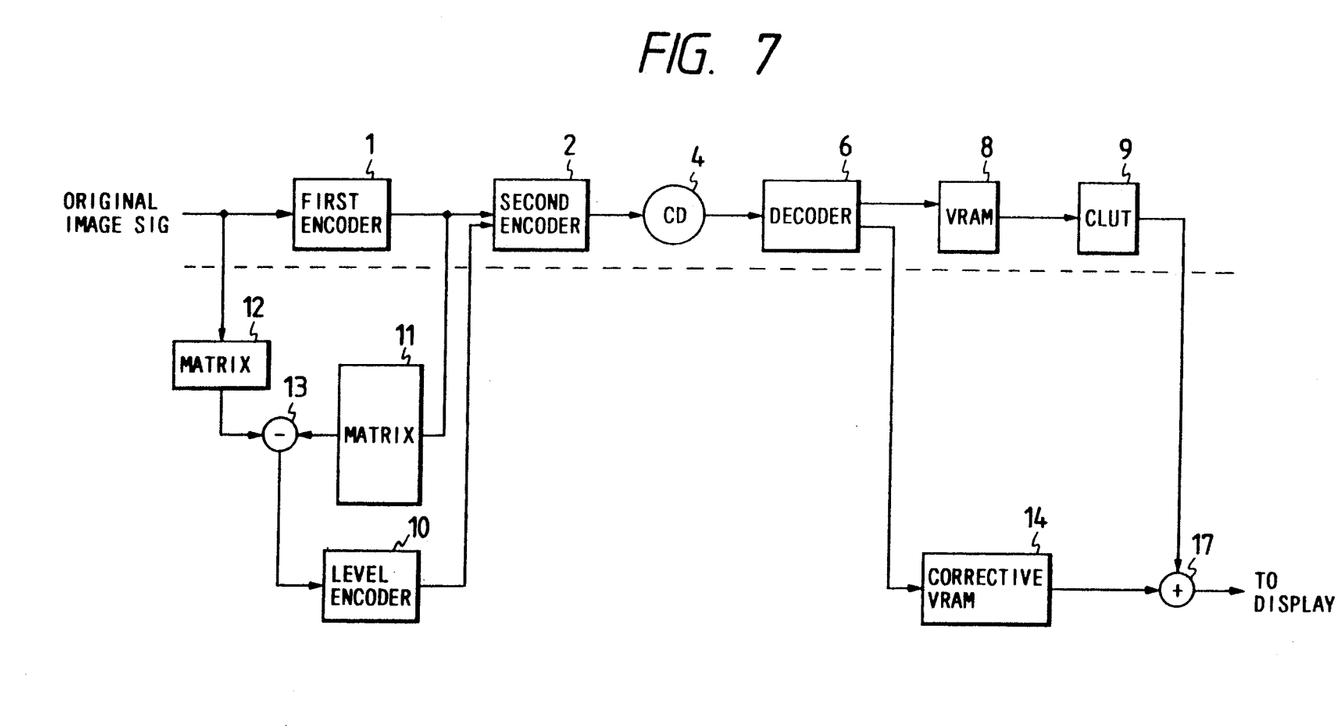
FIG. 7 is a block diagram of an encoding and decoding system according to a first embodiment of this invention.

FIG. 7 shows a video data encoding and decoding system according to a first embodiment of this invention. With reference to FIG. 7, original color image data are converted by a first encoder 1 into a transmission color image signal through an encoding process. This encoding process includes sub processes such as a sampling process and an approximation process. During the approximation process, color codes are generated by using colors of high appearance frequencies or colors near those colors as representatives. The transmission image signal is inferior to the original image data since the transmission image signal is generated from the original image data through data compression using the approximation process. The transmission image signal is fed from the first encoder 1 to a second encoder 2 and a first matrix device 11.

The first matrix device 11 extracts a luminance component from the transmission image signal. A second matrix device 12 extracts a luminance component from the original image data. A subtracter 13 derives the difference between the luminance component of the transmission image signal and the luminance component of the original image data. The derived difference between the luminance components is an error corresponding to the degree of the inferiority of the transmission image signal to the original image data. An output signal from the subtractor 13 is converted by a level converting encoder 10 into a luminance corrective signal corresponding to the luminance component difference. The luminance corrective signal is fed from the level converting encoder 10 to the second encoder 2.

The transmission image signal is recorded on areas of R-W subcodes of a CD 4 via the second encoder 2 and a recording device (not shown in FIG. 7) with a mode "001" and an item "001". The luminance corrective signal is recorded on the areas of R-W subcodes of the CD 4 via the second encoder 2 and the recording device with a mode "001" and an item "010".

The transmission image signal is reproduced from the CD 4 by a reproducing device (not shown in FIG. 7), and is then demodulated by a decoder 6 into a reproduced image signal including color pixel data. The color pixel data are stored into a RAM 8 for video. Simultaneously, the luminance corrective signal is reproduced from the CD 4 by the reproducing device, and is then demodulated by the decoder 6 into reproduced luminance corrective data. The reproduced luminance corrective data are stored into a RAM 14 for video. The color pixel data read out from the video RAM 8 are converted by a CLUT section 9 into R, G, and B color data. The R, G, and B color data outputted from the CLUT section 9 are converted by D/A converters (not shown in FIG. 1) into corresponding analog R, G, and B color signals. The luminance corrective data read out from the RAM 14 are converted by a D/A converter (not shown in FIG. 1) into a corresponding analog luminance corrective signal. The analog luminance corrective signal and each of the analog R, G, and B color signals are mixed or added by a mixer or adder 17. An output signal from the mixer 17 which includes color components and luminance corrective components are fed to a display (not shown) to be indicated as CD graphics.

In the video data encoding and decoding system of FIG. 7, the devices 10, 11, 12, 13, 14, and 17 are newly provided while the devices 1, 2, 4, 6, 8, and 9 are basically similar to those in the prior art system of FIGS. 5 and 6 which are designed in accordance with the CD format based on the Industry Standards. Accordingly, the system of FIG. 7 is compatible with the conventional system.

Since the luminance corrective data are recorded (transmitted) in addition to the color pixel data as described previously, the color tone quality can be improved relative to the prior art system while maintaining the compatibility with the prior art system.

Figure 8:
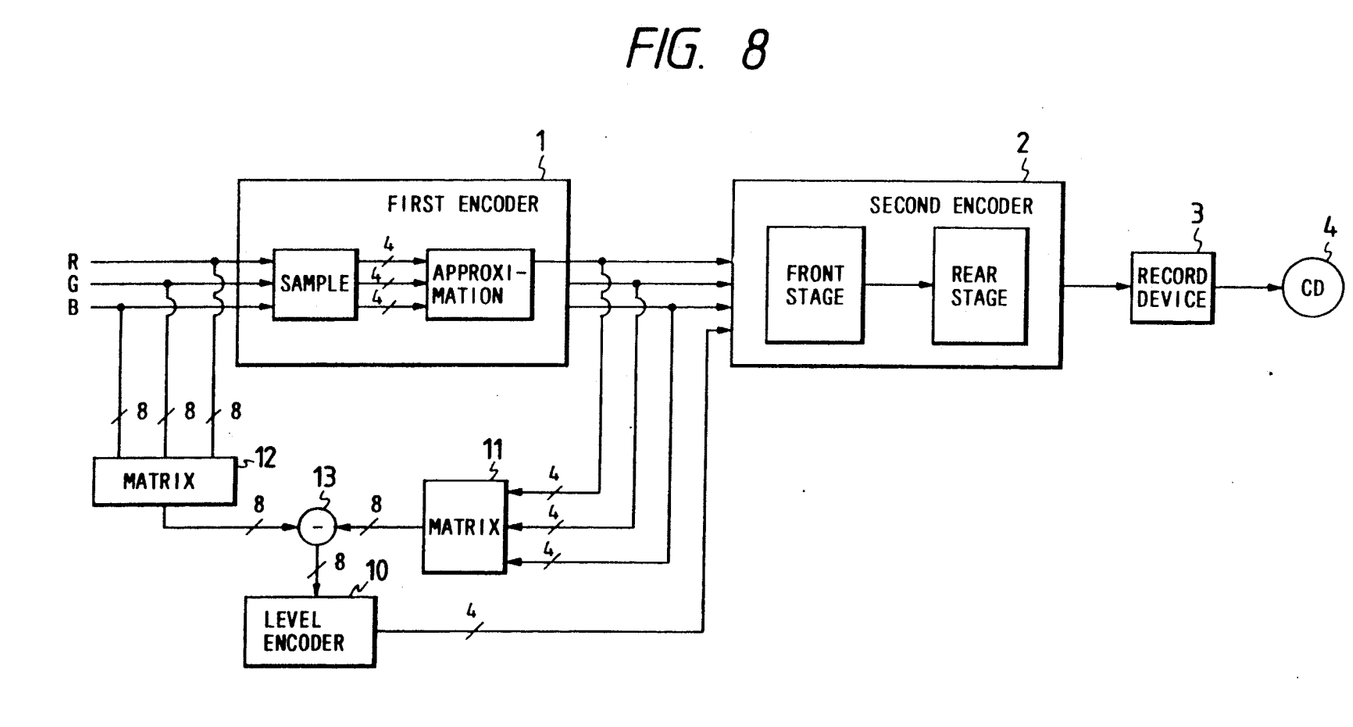
FIG. 8 is a block diagram of the recording part of the system of FIG. 7.

The recording part of the system of FIG. 7 will be described in more detail with reference to FIG. 8. As shown in FIG. 8, the encoder 1 includes a sample section 1a and an approximation section 1b. The original color image data composed of the R, G, and B color signals are subjected by the sample section 1a to a sampling process, being converted into color image data of a predetermined number of pixels per frame and not to exceed a predetermined number of colors. Specifically, the predetermined pixel number corresponds to 285 dots by 192 dots. Each of the R, G, and B color signals is sampled with 16 different color tone levels, and the predetermined number of colors equals $4,096 = 16 \times 16 \times 16$.

The approximation section 1b generates approximate color image data close to the color image data fed from the sample section 1a. The approximate color image data are represented by at most 16 predetermined colors selected from 4,096 colors while the color image data from the sample section 1a are represented by at most 4,096 colors. For example, the approximation section 1b is composed of suitable devices such as a frame memory and a processor for image processing. The approximate color image data compose the transmission image signal which is fed to the second encoder 2 and the first matrix device 11.

The second encoder 2 includes a front stage 2a and a rear stage 2b. The front stage 2a receives the color image data from the first encoder 1. In the front stage 2a, the received color image data which are represented in unit of pixel are converted into color image data which are represented in unit of font, and 16 colors of one font are expressed by recurrence of two colors. The data conversion by the front stage 2a enables the data to be transmitted in response to the previously-mentioned commands of writing font and drawing EX-OR font. The front stage 2a generates color data of 16 preselected colors as CLUT (Color Look-Up Table), each of the color data having 12 bits equal to 4 bits by three colors and indicating which of 4.096 colors is selected. The CLUT data are transmitted following a load CLUT command. The output data from the front stage 2a are processed by the rear stage 2b, being made into packs and being provided with parities, and being interleaved.

The matrix device 11 extracts a luminance component from the transmission image signal fed from the first encoder 1. Specifically, the luminance component is derived by mixing R, G, and B components of the transmission image signal at a predetermined ratio such as "0.299R + 0.587G + 0.114B". The second matrix device 12 extracts a luminance component of the original color image data in a similar way. The subtracter 13 derives the difference between the luminance component of the transmission image signal and the luminance component of the original image data. The derived difference between the luminance components is an error which results from the sampling process and the approximation process in the first encoder 1 and which corresponds to the degree of the inferiority of the transmission image signal to the original image data.

The output signal from the subtracter 13 is converted by the level converting encoder 10 into the luminance corrective signal through a non-linear transform. Specifically, small values of the output signal from the subtracter 13 are quantized with fine quantization steps while large values of the output signal from the subtracter 13 are quantized with rough quantization steps. The value of the output signal from the subtracter 13 is converted through the quantization into one of a predetermined number of different levels represented by respective luminance numbers. For example, the luminance number varies from "0" to "15" and is represented by 4 bits. In CD graphics, the instructions (commands) of writing font and drawing EX-OR font allow the transmission of data which represents one of 16 different states (colors) as understood from the previous description, so that the luminance corrective information of 16 different states can be transmitted by use of these instructions. When the level of the luminance corrective signal is required to be changed, the change requirement information is transmitted in accordance with the command of load CLUT. In the case where a table of the levels of the luminance corrective signal is predetermined, the transmission of the change requirement information is unnecessary. The luminance corrective signal is fed to the second encoder 2.

In the second encoder 2, the luminance corrective signal is made into fonts and packs, being provided with parities and being interleaved together with audio data and standard image data. The luminance corrective component of the output data from the second encoder 2 is optically recorded by the recording device 3 on the R-W subcode areas of the compact disk 4.

The color image data and the luminance corrective data are discriminated from each other by the mode and the item of R-W subcodes of the CD format. Specifically, the color image data fed from the encoder 1 are recorded or transmitted with the mode "001" and the item "001". The luminance corrective data fed from the level converting encoder 10 are recorded or transmitted with the mode "001" and the item "010". After one frame of the transmission image signal is recorded, the luminance corrective signal corresponding to that frame is recorded.

The luminance corrective signal may be denoted by the item "001". In this case, other commands which have been undefined in the conventional CD graphics system are used for identifying the luminance corrective signal. The luminance corrective signal may be denoted by an item and a mode other than the previously-mentioned item and mode.

Figure 9:
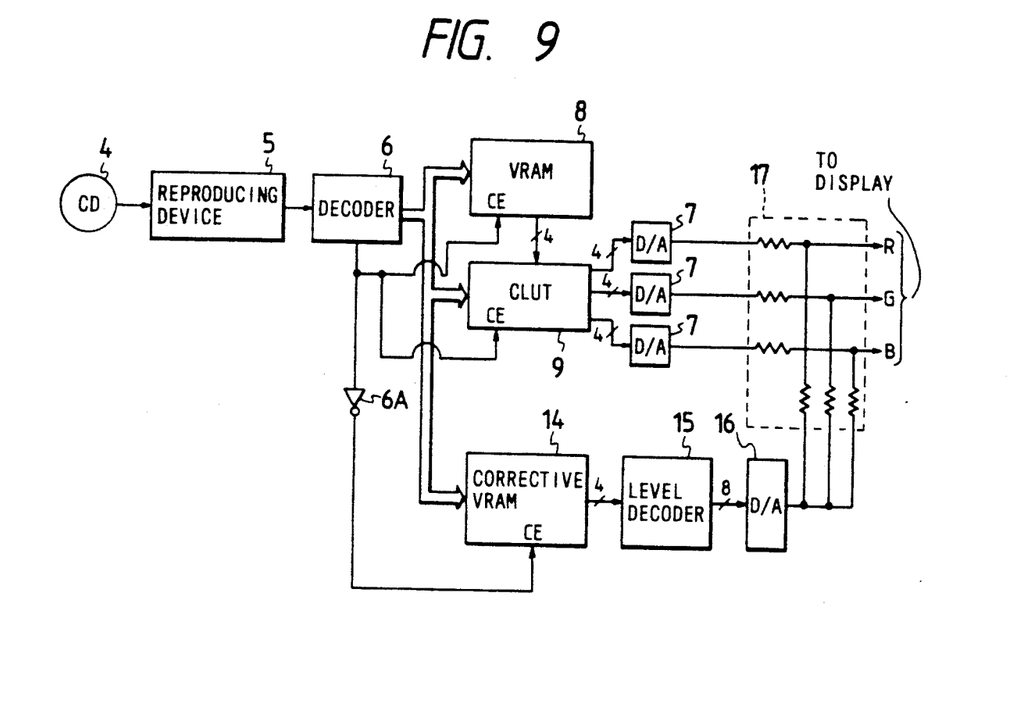
FIG. 9 is a block diagram of the reproducing part of the system of FIG. 7.

The reproducing part of the system of FIG. 7 will be described in more detail with reference to FIG. 9. As shown in FIG. 9, the reproducing part includes the reproducing device 5 which optically reproduces a digital signal from the compact disk 4. The reproduced digital signal is de-interleaved and is subjected to the error correction process by the decoder 6, and R-W subcodes are extracted from the reproduced digital signal. The decoder 6 detects the item of the R-W subcodes and selects one or two of the video RAM 8, the CLUT section 9, and the luminance corrective RAM 14 in accordance with the detected item. The output data from the decoder 6 are written into the selected one or two of the devices 8, 9, and 14.

Specifically, the decoder 6 generates a write control signal in response to the item bits. When the item bits are "001", the decoder 6 outputs a "1" signal to the video RAM 8 and the CLUT section 9 as a write enable signal. At the same time, the decoder 6 outputs the "1" signal to an inverter 6A, which outputs a "0" signal to the luminance corrective RAM 14 as a write inhibition signal. When the item bits are "010", the decoder 6 outputs a "0" signal to the video RAM 8 and the CLUT section 9 as a write inhibition signal. At the same time, the decoder 6 outputs the "0" signal to the inverter 6A, which outputs a "1" signal to the luminance corrective RAM 14 as a write enable signal. Accordingly, the following operation is performed. In the case where the detected item is "001", the image pixel data on the R-W subcodes are written into the video RAM 8 in unit of font and one frame of the image data are sequentially prepared in the video RAM 8 while the color data are written into the CLUT section 9. In the case where the detected item is "010", the luminance corrective data on the R-W subcodes are written into the luminance corrective RAM 14 in unit of font.

The image pixel data are sequentially fed from the video RAM 8 to the CLUT section 9. The CLUT section 9 generates R, G, and B color data on the basis of the image pixel data and the color data. The R, G, and B color digital signals from the CLUT section 9 are converted by D/A converters 7 into corresponding analog R, G, and B color signals. The analog R, G, and B color signals are fed to the adder 17.

The luminance corrective data are read out from the luminance corrective RAM 14 in synchronism with the reading of the data from the CLUT section 9. The output luminance corrective data from the luminance corrective RAM 14 are converted by a level converting decoder 15 into second luminance corrective data. The characteristics of the level converting decoder 15 are designed so as to match the characteristics of the level converting encoder 10 (see FIGS. 7 and 8). The second luminance corrective data are converted by a D/A converter 16 into a corresponding analog luminance corrective signal. The analog luminance corrective signal is fed to the adder 17. The adder 17 adds the analog luminance corrective signal to each of the R, G, and B color signals, correcting the R, G, and B color signals in accordance with the analog luminance corrective signal and thereby generating second R, G, and B color signals. The second R, G, and B color signals are fed to a display (not shown) to be indicated as CD graphics.

Figure 10:
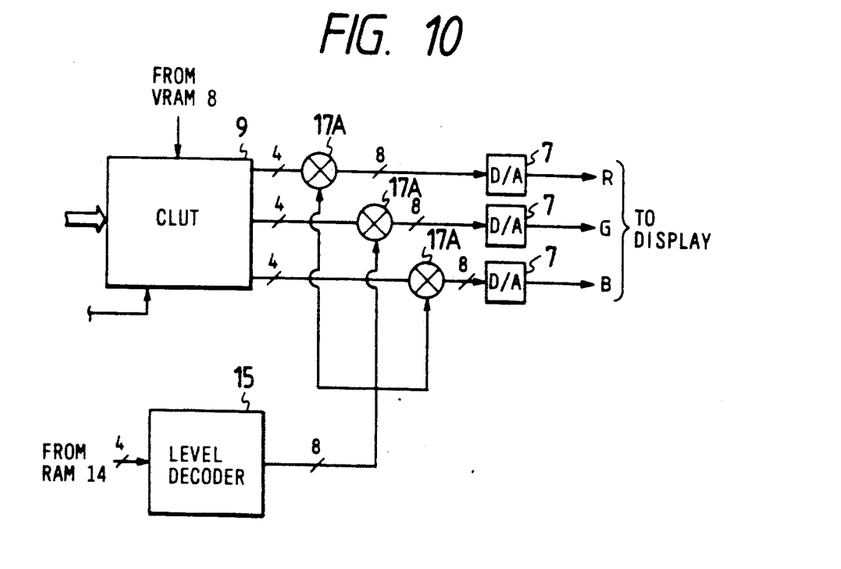
FIG. 10 is a block diagram of a reproducing part of a system according to a second embodiment of this invention.

FIG. 10 shows a reproducing part of a second embodiment of this invention. The second embodiment is similar to the first embodiment except for the design indicated hereinafter. The reproducing part of FIG. 10 includes adders 17A which digitally add the output data from the level converting decoder 15 to the R, G, and B color data from the CLUT section 9. Output data from the adders 17A are converted by D/A converters 7 into corresponding analog R, G, and B color signals fed to a display (not shown).

What is claimed is:
1. A compact disk graphics system comprising:
   a first encoder for compressing color information in a color image signal and encoding said color image signal into a discrete number of first codes;
   means for deriving a first luminance component from the first codes;
   means for deriving a second luminance component from the color image signal;
   means for deriving a difference signal from the first luminance component and the second luminance component;

means for generating a luminance level corrective signal in response to the difference signal for correcting a level of luminance components of the first codes;

a second encoder encoding the first codes into second codes in a predetermined compact disk signal format and for encoding the luminance level corrective signal into third codes in the compact disk signal format; and means for recording the second codes and the third codes into the compact disk.

2. The compact disk graphics system of claim 1 further comprising:

means for reproducing the second codes and the third codes from the compact disk;

means for decoding the reproduced second codes and the reproduced third codes into a decoded image signal and a decoded luminance level corrective signal, respectively; and means for correcting the decoded image signal in response to the decoded luminance level corrective signal and thereby generating a luminance-corrected image signal.

* * * * *